Feb. 3, 1959 W. ZAREKO 2,872,140
FRAME MOUNTING
Filed March 27, 1956 2 Sheets-Sheet 1
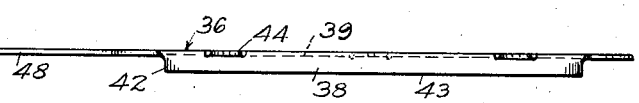
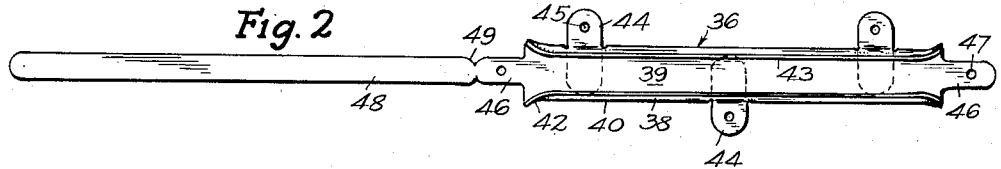
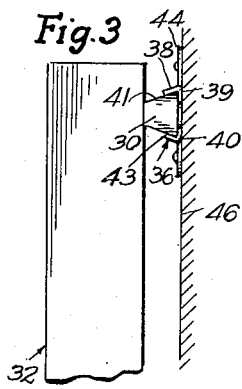
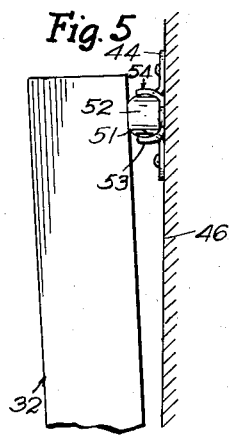
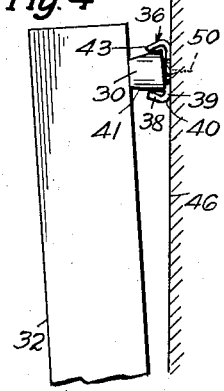
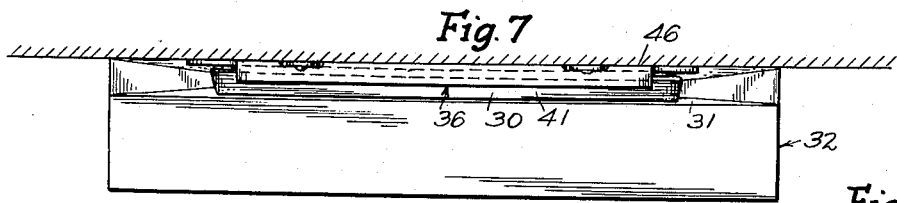
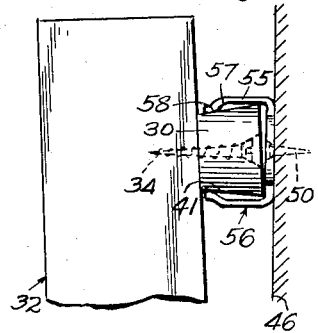
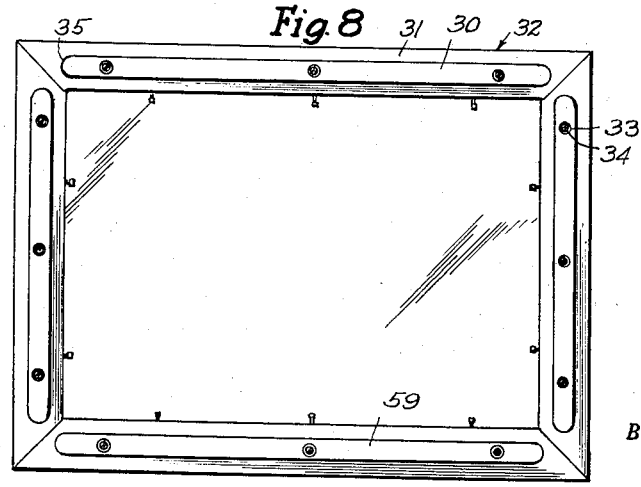
INVENTOR.
Walter Zareko
BY
*Harry Jacobson*
ATTORNEY Feb. 3, 1959  W. ZAREKO  2,872,140
FRAME MOUNTING
Filed March 27, 1956  2 Sheets-Sheet 2
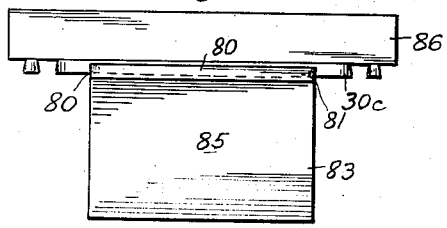
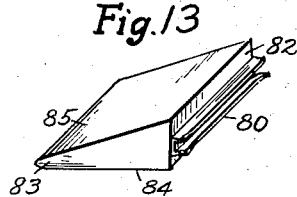
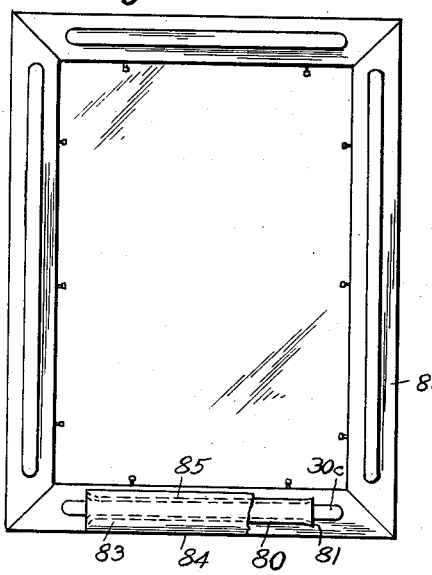
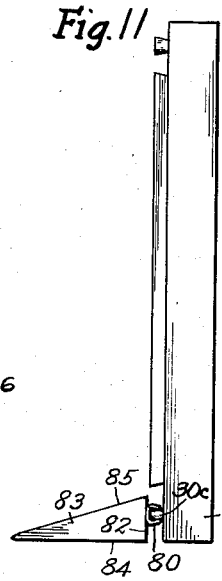
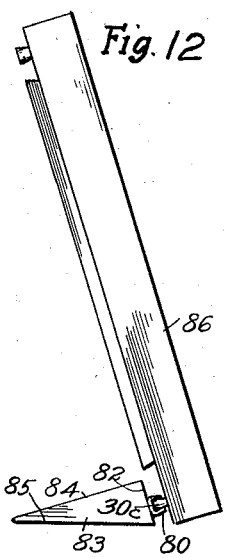
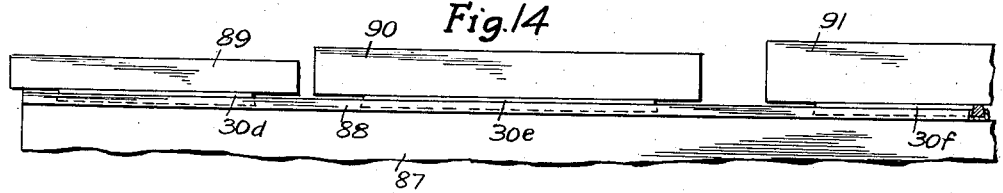
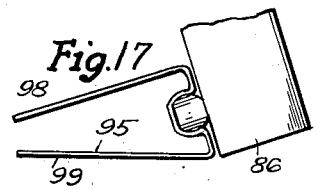
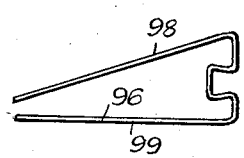
INVENTOR.
Walter Zareko
BY Harry Jacobson
ATTORNEY United States Patent Office 2,872,140
Patented Feb. 3, 1959

2,872,140

FRAME MOUNTING

Walter Zareko, New York, N. Y.

Application March 27, 1956, Serial No. 574,183

10 Claims. (Cl. 248—28)

This invention relates to picture frames or the like and particularly to the mounting means therefor whereby the frame may be adjustably suspended on a wall, or set on an easel in any one of a number of selected positions.

The invention contemplates the provision of one or more fixed properly shaped guides at the back of the top, bottom or sides or rails of a frame to cooperate with a channel slide designed to be moved longitudinally of the guide into an adjusted position thereon and means to support the slide either in engagement with a wall to constitute a hanger support for the frame or on a member intended to rest on a horizontal surface to constitute an adjustable easel.

The invention further contemplates the provision of a fixed guide on the back of a frame, of a cross sectional shape which is widest in a plane in parallel rearward spaced relation to the back of the frame and a cooperating relatively stiff but slightly resilient channel slide embracing the guide and in contact with a narrower part thereof in front of said plane whereby the slide can be deliberately adjusted longitudinally of the guide but cannot normally be pulled off the guide by a rearward movement or accidentally displaced, though yielding sufficiently to open up slightly out of its normal shape thereby to grasp the guide firmly enough to support the entire weight of the frame and to permit slight forcible tilting of the frame if required.

The invention further contemplates the provision of a variety of supports for the frame to permit the frame to be arranged and supported in a manner to suit the fancy of the user when the slide is adjusted in position to engage and grip one of the fixed guides of the frame.

The various objects of the invention will be clear from the description which follows and from the drawings, in which Fig. 1 is a top plan view of that form of the slide constituting a frame hanger.

Fig. 2 is a front elevational view of Fig. 1.

Fig. 3 is a side elevational view of a frame with a single guide at the top rail thereof of dovetailed cross sectional shape, and of the cooperating slide of Fig. 1 in operative position and secured to a wall.

Fig. 4 is a similar view of the same, the frame being shown tilted slightly within the resilient slide.

Fig. 5 is a similar view showing a guide and slide having a modified cross sectional shape.

Fig. 6 is a similar view of another modification.

Fig. 7 is a top plan view of Fig. 4, the handle for the slide having been broken off.

Fig. 8 is a rear elevational view of a frame to each rail of which a guide has been secured whereby the frame may be hung with any of its outer edges uppermost.

Fig. 9 is a rear elevational view of a frame similar to Fig. 8 showing an easel type of support.

Fig. 10 is a top plan view of Fig. 9.

Fig. 11 is a side elevational view of Fig. 9.

Fig. 12 is a similar view showing the easel member reversed or upside down and tilting the frame.

Fig. 13 is a perspective view of the easel member.

Fig. 14 is a top plan view of an elongated easel member and of three frames supported thereby.

Fig. 15 is a side elevational view partly in section of a modified form of the easel member.

Fig. 16 is a fragmentary elevational view similar to Fig. 11 of a modified form of the slide and guide.

Fig. 17 is a similar view of another form of the easel member.

Fig. 18 is a similar view of another form of the combined slide and easel member.

In that form of the invention shown for example in Figs. 1–4, a single guide 30 of about the same width as its thickness is secured to or formed integrally with the top rail 31 of the frame 32, though it will be understood as shown in Fig. 8, that a similar guide may be secured to or formed in one piece with each rail of the frame in order that any rail may be the top one, or that such side and bottom rails may cooperate with supports best suited therefor. The guide is preferably of dovetailed cross sectional shape and is provided with suitable countersunk holes 33 for the passage of the screws 34 (Figs. 6 and 8) whereby the guide may be attached to any rail of the frame which is not initially equipped with such guides. Obviously the guide may be formed initially as an integral part of the rail when the frame is made, in which case there is no need to attach the guide to the rail. To aid in mounting the slide on the guide, each end 35 of the guide is preferably rounded. The guide is so shaped that the front surface thereof or where it meets the rail, is its narrowest part, being there secured or formed with the rear face of the rail. The guide is preferably of uniform width. The widest part of the guide is preferably in a plane in parallel rearward spaced relation to the rear face of the rail. The rear face of the guide 30 constitutes the widest part thereof, but as shown in Figs. 5 and 16, the guide may be other than dovetailed in cross section, for example cylindrical, provided that the flanges of the slide project forwardly past the widest part of the guide and that said widest part is behind or rearwardly of the rear face of the rail. The length of the guide is preferably about that of the inner edge of the rail to which it is attached to provide for maximum adjustment.

As has been indicated, the slide supports may take various forms depending on the manner in which the frame or frames are to be supported. In any case, including the hanger type of support being described, the slide is made of sheet metal or plastic of sufficient thickness to maintain its shape under stress but preferably with slightly resilient bends providing a spring action urging the flanges thereof into firm engagement with the tapered operative guide surfaces. As shown in Figs. 1–4, the slide 36 is in the form of a channel of dovetailed cross sectional shape having side flanges 38 integrally connected to the web 39 by the resilient bends 40, the width of each of said flanges being less than the width of the forwardly converging side surfaces 41 of the guide but being extended forwardly past the widest part of the guide. At the end portions 42 thereof, as best seen in Fig. 2, the flanges are bent away from each other or flared to permit the fixed guide to be readily inserted therebetween. The free edges 43 of the slide are normally and initially slightly closer together than when said edges engage the fixed guide 30. Consequently, when the slide is mounted on the guide, the flanges 38 move slightly apart, the bends 40 yielding sufficiently for that purpose and urging and maintaining the flanges in pressed engagement with the guide while permitting the slide to be deliberately adjusted longitudinally.

For use as a hanger for the frame, some of the material of the web 39 is cut around three sides to form an ear 44 which is bent transversely outwardly from and coplanar with the web as will be seen from Fig. 2. A perforation 45 in the ear permits a nail 50 (Figs. 4 and 6) or other suitable fastening element to be passed therethrough into a wall 46 or the like to secure the slide to such wall support. In addition to or in place of the transverse ears 44, end extensions or ears as 46 of the web may be used, each having a perforation 47 therein for the passage of a nail or the like. To aid in manipulating the hanger when it is desired to fasten it in place, the web 39 is further extended at one end past the ear 46 into an elongated handle 48, notches as 49 being made in the edges thereof to weaken the web at a desired break-off point after the slide has been fastened in place.

To hang a frame such as a picture frame or mirror frame, the guide 30 is first secured to the back surface of the top rail of the frame. The slide 36 is then forced on to the guide, the flanges of the slide spreading apart slightly for this purpose. By means of the handle 48, the slide is moved longitudinally to the middle of the guide 30 and the frame with the slide attached is arranged at the desired position on the wall. The slide is maintained in the position selected by means of the handle 48 which is held against the wall while the frame is slid either to the right or left to expose one or more of the ears 46 or 44, the thus exposed ear being then nailed to the wall. The frame may then be removed or slid in the opposite direction relatively to the slide to expose the other ears which are then nailed in place. After the fastening operation, the frame is mounted on the slide by means of the guide, moved to expose the notches 49 and the handle 48 broken off at the notches. Thereafter, the frame is centered on the slide and remains fixed in the exact position originally selected against possibility of shifting out of place, as frequently occurs with other hanging means such as wires, screw eyes or the like. It is comparatively easy to remove the frame for cleaning, repair or replacement and to remount it, while the necessity for wires or the like is eliminated.

As shown in Fig. 4, the ears 44 may be omitted. The flanges 38 may move apart sufficiently when desired, owing to the resilience of the bends 40, to permit the frame to be tilted so that the bottom rear edge thereof rests against the wall. In the form of the invention shown in Fig. 5, the sides 51 of the fixed guide 52 are convex or cylindrical and the flanges 53 of the channel slide 54 extend forwardly past the widest part of and grasp a narrower part of the guide. Said widest part of the guide is at a plane parallel to and spaced rearwardly from the back surface of the frame as in the guide 30. In Fig. 6, the flanges 55 of the slide 56 are generally parallel and somewhat yieldable as in the other forms of the slide just described, but the free edge portions thereof are bent first inwardly toward each other as at 57 and then outwardly away from each other as at 58 to form a curved portion urged into contact with the guide, preventing accidental displacement thereof but permitting the slide to be deliberately adjusted longitudinally and also tilted. While a single hanger for the top rail of the frame is in most cases sufficient for adequate support, it is obvious that for extraordinarily heavy frames, a slide may if required be conveniently mounted additionally on the guide 59 (Fig. 8) of the lower rail of the frame and fastened to the wall.

Referring now to that form of the invention shown in Figs. 9–18, it may be desired to support one or more frames on a table top by means of the guides on the lower rails thereof instead of those at the side or top rails, in which case an easel type of support is used to carry the slide. The slide 80 having flared end portions 81 is secured to an edge of a wedge-shaped block 83. Preferably, the surface 82 thereof is perpendicular to the surface 84 and makes an acute angle with the remaining surface 85 on which the block may rest. The slide is manipulated by movement of the block to which it is secured. As seen in Figs. 9–11, the lowermost guide 30c of the frame 86 is preferably arranged the same distance above the lowermost edge of the frame as the slide 80 is above the surface 84 of the block. Consequently, when the slide has been mounted on its guide 30c the surface 84 and the lowermost edge of the frame are coplanar and both rest on the same supporting surface with the frame vertical and supported by the relatively broad base of the block against overturning.

If the frame is to stand in a tilted position, the block 83 is turned upside down, that is, with the surface 85 lowermost and in that position, it is mounted on the lowermost guide 30c to assume the arrangement shown in Fig. 12. Where several frames are to be supported in side by side relation, the width of the block 87 (Fig. 14) is correspondingly increased and the cooperating slide 88 elongated accordingly. Said slide is then mounted on the various guides 30d, 30e and 30f of the respective frames 89, 90 and 91 and serves to support them all in upright or tilted position in the same manner as the block 83.

The block and the guides are made of any suitable material such as wood, plastic, metal or the like. In Fig. 15, the block 92 is shown made of plastic and is hollow, a groove 93 being provided in the front face thereof for the reception of the somewhat resilient slide 94 which is fixed in the groove, but the flanges of which can yield in the manner previously described. In Figs. 17 and 18, the respective slides 95 and 96 are combined with the easel and formed of a single piece of sheet metal having the angularly disposed supporting surfaces 98 and 99. The cross sectional shape of the slides may vary considerably, those of Figs. 16 and 17 being illustrated as generally cylindrical and those of Figs. 10–15 as dovetailed. However, the widest part of the guide is arranged, as in the guides heretobefore described, at a plane in rearward spaced relation to its front surface, so that the correspondingly shaped slide embraces the guide to extend forwardly past said widest part but terminates rearwardly of said front surface, whereby the slide can only be removed from the guide by relative lonigtudinal sliding movement.

It will be seen that I have provided a simple supporting means for a frame, comprising fixed tapered guides on the back surfaces of the rails thereof and a channel slide mounted on any selected one of the rails, the guide on the top rail being selected when the frame is to be hung, and that on the bottom rail when the frame is to be supported on a table top in tilted or upright position. It will also be seen that the supports for the slide may take various forms such as ears or blocks and that the invention is adequately designed to meet the usual requirements for devices to mount picture or the like frames.

While I have shown and described certain specific forms of the invention, various obvious changes may be made therein without departing from the spirit of the invention defined by the appended claims.

I claim:

1. The combination with a picture frame, of a first elongated guide of dovetailed cross sectional shape fixed to the back of the frame and of lesser length than the height of the frame, a second similar guide fixed to the back of the frame perpendicularly to the first guide and of lesser length than the width of the frame, there being a space between the inner edge of the second guide and the adjacent end of the first guide for the passage of the slide hereafter mentioned, a grooved slide receiving and frictionally retaining a selected one of the guides in the groove thereof, and means to support the slide on a supporting surface, the slide supporting means comprising a wedged shaped member.

2. In a frame mounting, a frame having an opening therein, a first guide having the front surface thereof fixed to the rear surface of a rail of the frame and of substantially the length of the opening and having side surfaces converging forwardly at the front portions thereof, the thickness of and the greatest width of said guide being approximately the same, a second similar guide fixed to the rear surface of a rail of the frame perpendicular to and beyond the adjacent end of the first guide and of a length substantially that of the width of the opening, and a channel shaped slide having side flanges, a bend at the rear edge of each flange and a rear web integrally joining the bends, the front free edge portions of the flanges converging forwardly and grasping the respective side surfaces of a selected guide at lines spaced rearwardly of the front surface of the guide and at a plane in parallel rearward spaced relation to said front surface with sufficient force to maintain the slide in any selected position on the guide until deliberately moved in a longitudinal direction out of said position whereby the frame may be supported by the slide in either one of two different positions.

3. The frame mounting of claim 2, the guides being of dovetailed cross sectional shape.

4. The frame mounting of claim 2, and means associated with the slide and secured thereto and adapted to engage a support for removably mounting the frame on the support.

5. The frame mounting of claim 4, said means comprising a supporting member for the slide having a pair of surfaces arranged angularly with respect to each other and selectively adapted to engage and rest on a horizontal surface constituting said support.

6. The frame mounting of claim 2, said means comprising an easel member of substantially triangular cross sectional shape adapted to have either surface thereof other than that carrying the slide in contact with and resting on a horizontal surface to mount the frame on said surface in either an upright or in a tilted position.

7. In combination, a picture frame having a back surface and having an opening therein, a first guide having a cross sectional shape narrower at the front than at the rear thereof fixed to the peripheral part of the back surface of the frame with the narrower front surface of the guide engaging said back surface, the length of said guide being substantially equal to the length of the opening of the frame as measured parallel to said guide, the ends of the guide being rounded, a second guide similar to the first guide secured to said back surface in a position perpendicular to said first guide and in outward spaced relation to the adjacent rounded end of said first guide, the length of the second guide being substantially equal to the width of the opening as measured parallel to said second guide, a slide embracing and grasping the side surfaces of a selected one of the guides, the slide having a groove therethrough of substantially the same cross sectional size and shape as that of the guide, and means on the slide adapted to engage a supporting element for supporting the slide on said element, the slide, including said means, being of sufficiently low height to pass by the adjacent rounded end of one guide when mounted on and moved longitudinally off the other guide, thereby to permit the frame to be mounted on the slide by means of either guide and in either of two mutually perpendicular positions.

8. A wedge shaped reversible easel for a picture frame, said easel having a wide side surface and a grooved portion on said side surface, the groove of said portion being arranged substantially midway between the faces of the easel and having outwardly converging side edge surfaces, whereby either of the faces of the easel is adapted to rest on a substantially horizontal surface thereby to arrange the groove in either a tilted or an untilted position, a frame, and an elongated guide of dovetailed cross sectional shape secured to the back of the frame and slidably fitted into the groove of the easel portion.

9. A reversible one piece easel support for a picture frame, said support having a pair of relatively wide faces adapted selectively to rest on a substantially horizontal surface, the side surface of the support extending between said faces having a dovetail groove therein extending from one end through the opposite end of the support, the faces being non-parallel and the sides of the groove converging outwardly, a picture frame having an opening therein and having a back surface, and an elongated guide of dovetailed cross sectional shape secured to said back surface and substantially coextensive with and below the opening, said guide being frictionally retained in the groove of the support to connect the frame and the support removably, the faces of the support being of sufficient area to prevent accidental overturning of the frame when a face of the support rests on a substantially horizontal surface with the frame projecting upwardly therefrom.

10. In a frame having a rear face and having an opening therein, a first guide projecting rearwardly from said face and adapted to engage slidably and to hold a mounting slide for supporting the frame, said guide being arranged in substantially outward spaced relation to the adjacent edge of the opening and being substantially coextensive with one dimension of said opening, the guide being widest at a plane in parallel rearward spaced relation to said rear face and having side surfaces converging forwardly from the aforesaid widest part thereof, the thickness and the width of said widest part of the guide being substantially the same, a second guide similar to the first guide and substantially perpendicular thereto and in outward spaced relation to the adjacent edge of the opening and substantially coextensive with another dimension of said opening perpendicular to the first-mentioned dimension, secured to said rear face of the frame, and a supporting member having a groove therein slidably receiving one guide and having an inwardly extending portion thereon adjacent the groove and of lesser width than the distance between the adjacent end of the other guide and the inner edge of said one guide, whereby the support may be moved past said end of said other guide and off said one guide.

References Cited in the file of this patent

UNITED STATES PATENTS

| 394,144 | Sword | Dec. 4, 1888 |
| 547,050 | White | Oct. 1, 1895 |
| 929,010 | Provencher | July 27, 1909 |
| 1,294,446 | Greenstreet | Feb. 18, 1919 |
| 1,489,987 | Deetz | April 8, 1924 |
| 2,478,014 | Rogers | Aug. 2, 1949 |
| 2,650,870 | Carpenter | Sept. 1, 1953 |

FOREIGN PATENTS

| 667,675 | France | June 24, 1929 |